United States Patent
Heifetz

(10) Patent No.: US 6,599,850 B1
(45) Date of Patent: Jul. 29, 2003

(54) FLEXIBLE REFLECTIVE INSULATING STRUCTURES

(76) Inventor: Raphael Heifetz, 11 Feinberg Street, Hadera (IL)

( * ) Notice: Subject to any disclaimer, the term of this patent is extended or adjusted under 35 U.S.C. 154(b) by 0 days.

(21) Appl. No.: 09/501,592

(22) Filed: Feb. 10, 2000

(51) Int. Cl.⁷ .......................... B32B 15/14; B32B 33/00; D04D 1/00; D04D 13/00; D04D 3/00; D04D 5/00; D03D 15/00
(52) U.S. Cl. ............... 442/376; 442/378; 442/379; 442/22; 442/228; 442/230; 442/231; 442/232; 442/233; 428/91
(58) Field of Search .................. 442/378, 379, 442/13, 14, 23, 228, 232, 233, 230, 231, 376; 428/91, 198, 218

(56) References Cited

U.S. PATENT DOCUMENTS

| | | | |
|---|---|---|---|
| 3,616,139 A | 10/1971 | Jones | |
| 3,772,137 A * | 11/1973 | Tolliver | 161/169 |
| 4,247,599 A | 1/1981 | Hopper | |
| 4,430,286 A * | 2/1984 | Franz | 264/258 |
| 4,531,511 A | 7/1985 | Hochberg | |
| 4,622,253 A * | 11/1986 | Levy | 428/91 |
| 4,637,947 A * | 1/1987 | Maekawa et al. | 428/68 |
| 4,656,081 A * | 4/1987 | Ando et al. | 442/378 |
| 5,227,230 A * | 7/1993 | McGlade | 428/309.9 |
| 5,230,941 A | 7/1993 | Hollander et al. | |
| 5,549,956 A | 8/1996 | Handwerker | |
| 5,677,027 A * | 10/1997 | Masuda et al. | 428/96 |
| 5,767,024 A * | 6/1998 | Anderson et al. | 442/378 |

* cited by examiner

Primary Examiner—Elizabeth M. Cole
Assistant Examiner—Jeremy R. Pierce
(74) Attorney, Agent, or Firm—Mark M. Friedman

(57) ABSTRACT

A flexible reflective insulating structure includes a layer of flexible fiber-based material, and a flexible metallic layer having a first surface of emissivity less than 0.1. The metallic layer is attached to the layer of fiber-based material with its first surface facing towards the layer of fiber-based material. The fiber-based material is preferably attached to the metallic layer in a manner such that the emissivity of at least about 85% of the first surface, and preferably at least about 95% and most preferably at least about 97% is substantially unaffected.

24 Claims, 3 Drawing Sheets

FLEXIBLE REFLECTIVE INSULATING STRUCTURES

FIELD AND BACKGROUND OF THE INVENTION

The present invention relates to reflective insulation and, in particular, it concerns flexible reflective insulating structures for various uses.

Different types of insulation products reduce the heat transferred by conduction, convection and radiation to varying degrees. As a result, each provides different thermal performance and corresponding "R" and "U" values (used to quantify heat transfer properties). The primary function of reflective insulation is to reduce radiant heat transfer across open spaces, which is a significant contributor to heat gain in summer and heat loss in winter. The low emittance metal foil (usually aluminum) surface of the product blocks up to 97% of the radiation and therefore a significant part of the heat transfer.

Aluminum foil is not, by itself, an effective thermal insulator. On the contrary, it is a metal with a relatively high thermal conductivity. When, on the other hand, a foiled surface is adjoined by a "still" airspace, a reflective space acts as an insulating barrier as it retards radiant read (irrespective of heat flow direction) and thus reduces thermal transfer. In this context, it should be noted that the term "reflective", as used in reflective insulation, is in some ways a misnomer because the aluminum either works by reflecting heat (reflectance of 0.97) or by not radiating heat (emittance of 0.03). Whether stated as reflectivity or emittance, the performance (heat transfer) is the same.

The magnitude of that reduction of heat transfer is dependent upon maintaining the integrity of the airspace from a structural standpoint. The overall thermal efficiency of an airspace will vary with the content of moisture (which increases the thermal conductivity of air) and the presence of convective currents. The performance of reflective surfaces in radiant barrier insulators is enhanced by providing, maintaining and insuring an optimum adjoining airspace.

Currently available reflective insulating products have reflective surfaces on one or both outward-facing surfaces of a core medium. Such products, however, suffer from numerous shortcomings. Specifically, such products are only effective when used in conjunction with a structure for ensuring an airspace adjacent to the reflective surfaces. This generally adds very significant labor costs to installation of the insulation. Furthermore, the properties of the reflective surfaces are extremely prone to degradation due to deposition of dust and dirt, and effects of corrosion on the surfaces. Thus, an aluminum surface of initial emittance 0.03 may frequently be found to exhibit emittance values ten or more times greater due to accumulation of dirt. In moist or otherwise aggressive environments, the degradation may be greatly accelerated by corrosion of the metal surfaces. In cases of applications in the building industry, such as within cavity walls, dust present during installation may reduce the effectiveness of the insulation from the outset such that the theoretical values are never actually obtained.

In an attempt to address these problems of degradation, U.S. Pat. No. 4,247,599 to Hopper proposes a layered structure which includes an intermediate metal layer is covered by a protective layer of polyethylene which is relatively transparent to infrared. The primary low-emittance characteristic is provided by an exposed outer metal layer while the intermediate metal layer provides a "fail-safe feature" should the exposed metal layer be completely degraded.

The solution proposed by Hopper offers very inferior results due to the lack of an airspace adjacent to the intermediate metal layer. Thus, despite the relative transparency of the polyethylene, Hopper admits that the metal-polyethylene combination exhibits an actual emittance value of 0.35, more than ten times greater than that of aluminum exposed directly to an airspace.

An alternative approach to guarding the integrity of the reflective surfaces is to provide reflective surfaces facing inwards towards airspaces defined by an internal structure. Examples of systems of this type are described by U.S. Pat. Nos. 3,616,139 to Jones and 5,230,941 to Hollander et al. These patents disclose reflective insulation panels made up of a honeycombed paper structure enclosed by inward facing foil reflective surfaces to form an insulative reflective space.

While the panels of Jones and Hollander et al. may provide highly effective insulation, their usefulness is limited by the rigid nature of the panels. Specifically, the panels are bulky and awkward to transport, and cannot be used at all in a wide range of applications for which flexible insulating materials are required.

Finally, U.S. Pat. No. 5,549,956 to Handwerker discloses a reduced thickness flexible insulating blanket for use in the curing of concrete. The blanket includes one or more heat reflective layer of aluminum foil adjacent to an insulative layer of ¼ or ½ inch thickness bubble-pack type material. The bubbles are disposed in spaced relation so as to define between them open air spaces adjacent to the foil.

The blanket of Handwerker also suffers from various shortcomings. Firstly, the contact surface of the insulative layer with the reflective layer is relatively high. Although not described in detail, it appears from the illustrations that contact occurs over approximately 25% of the reflective surface, thereby greatly reducing the effectiveness of the reflective insulation. Additionally, the use of thin insulative layers containing open spaces with unrestricted air movement provides low resistance to conductive and convective heat transfer through the blanket. Finally, any attempt to produce thicker, more effective insulation by using multiple layers would reduce the flexibility of the blanket and lead to a bulky structure which would be costly and inconvenient to transport and handle.

There is therefore a need for flexible reflective insulating structures which would provide non-exposed reflective layers adjacent to an effective airspace which would also offer effective insulation against conductive and convective heat transport. It would also be highly advantageous to provide flexible reflective insulating structures which could be compactly stored and transported while being deployable to occupy an increased volume.

SUMMARY OF THE INVENTION

The present invention provides flexible reflective insulating structures for use in buildings, tents and other applications.

According to the teachings of the present invention there is provided, a flexible reflective insulating structure comprising: (a) a layer of substantially non-dust-generating, flexible fiber-based material; and (b) a flexible metallic layer having a first surface of emissivity less than 0.1, and preferably no more than 0.05, the metallic layer being attached to the layer of fiber-based material with the first surface facing towards the layer of fiber-based material in a manner such that the emissivity of at least about 85% of the first surface, and preferably at least about 95%, and most preferably at least about 97%, is substantially unaffected.

According to a further feature of the present invention, the layer of fiber-based material is a non-woven material.

According to a further feature of the present invention, the non-woven material is configured to be compressible to a compressed state for rolling to a rolled storage configuration and to recover when unrolled to an uncompressed state, the non-woven material occupying a volume when in the uncompressed state which is at least about two times a volume occupied by the non-woven material when in the compressed state.

According to a further feature of the present invention, the non-woven material has a bulk density of no more than about 4 kg/m$^2$, and preferably within the range from about 0.9 to about 2 kg/m$^2$, per 10 cm thickness when in the uncompressed state.

According to a further feature of the present invention, the layer of fiber-based material is formed primarily from polyester fibers.

According to a further feature of the present invention, the layer of fiber-based material includes crimped fibers.

According to a further feature of the present invention, the layer of fiber-based material exhibits a reduced density of fibers in a layer adjacent to the metallic layer relative to an average density of fibers in the fiber-based material.

According to a further feature of the present invention, the layer of fiber-based material includes a first component of fibers having a first diameter and a second component of fibers having a second diameter, the second diameter being at least twice the first diameter.

According to a further feature of the present invention, the layer of fiber-based material is a woven material, the woven material being processed to provide a plurality of raised fibers projecting outwards from the woven material for supporting the metallic layer.

According to a further feature of the present invention, the metallic layer is a sheet of metal foil.

According to a further feature of the present invention, the sheet of metal foil has a second surface opposite to the first surface, the insulating structure further comprising a substrate layer attached to the second surface.

According to a further feature of the present invention, the substrate layer is formed primarily from polymer material.

According to a further feature of the present invention, the polymer material has a thickness of at least 50 μm and contains at least one additive chosen to enhance weatherproof properties of the polymer material.

According to a further feature of the present invention, the polymer material is selected to be a non-tearing material, the polymer material, the metallic layer and the fiber-based material being sewed together.

According to a further feature of the present invention, there is also provided a sealant applied to the structure so as to seal regions which are sewed together.

According to a further feature of the present invention, the layer of polymer material includes a plurality of reinforcing element.

According to a further feature of the present invention, there is also provided a second metallic layer associated with a rear surface of the substrate layer.

According to a further feature of the present invention, the metallic layer is implemented as a layer of metal deposited onto a surface of a flexible substrate layer.

There is also provided according to a further feature of the present invention, a tent comprising at least one wall formed from the insulating structure of the present invention.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
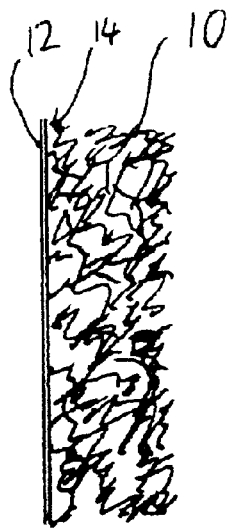
FIG. 1 is a schematic cross-sectional view through a basic one-sided embodiment of a flexible reflective insulating structure, constructed and operative according to the teachings of the present invention.

The present invention provides flexible reflective insulating structures for use in buildings, tents and other applications.

The principles and operation of flexible reflective insulating structures according to the present invention may be better understood with reference to the drawings and the accompanying description.

Referring now to the drawings, FIGS. 1–8 show various implementations and applications of flexible reflective insulating structures, constructed and operative according to the teachings of the present invention.

In general terms, each of the flexible reflective insulating structure of the present invention includes at least one layer 10 of flexible fiber-based material, and at least one flexible metallic layer 12 having a first surface 14 of emissivity less than 0.1, and preferably no more than about 0.05. Metallic layer 12 is attached to the layer 10 of fiber-based material with first surface 14 facing towards layer 10. The fiber-based material of layer 10 is preferably attached to metallic layer 12 in a manner such that the emissivity of at least 85% of first surface 14, and preferably at least about 95%, and most preferably at least about 97%, is substantially unaffected.

It should be appreciated that the use of a flexible fiber-based material adjacent in the low emittance surface provides profound advantages over the aforementioned prior art. Firstly, the nature of fiber-based materials lends itself to points or lines of contact with very small total area, thereby facilitating attachment of the reflective surface with minimal interference with the low emittance properties of the surface. At the same time, the fiber-based material has been found to behave almost exactly as an open airspace with respect to providing a radiant barrier with the reflective layer, while at the same time providing considerable resistance to air circulation so as to provide additional effective conventional insulating properties against convective and conductive heat transfer. These and other advantages of the present invention will become clearer from the following description.

With regard to the surprising observation that the fiber-based material behaves almost exactly as an open airspace in the radiant barrier, without in any way limiting the scope of the present invention, it is believed that this observation has a sound basis in the theory of reflective insulation. Specifically, it is known that the effective emittance E for a single reflective airspace bounded by two parallel surfaces perpendicular to the direction of heat flow is given by:

$$E = [(1/\epsilon_1 + 1/\epsilon_2 - 1]^{-1}$$

where $\epsilon_1$ and $\epsilon_2$ are the emittances of the of the respective surfaces. It follows that, if one of the surfaces has a low emittance (e.g. $\epsilon_1 = 0.039$), even if the second surface approaches black-body emittance (e.g. $\epsilon_2 = 0.9$), the overall emittance E of the system remains low (E=0.039). Thus, so long as the contact area is kept to very low levels, the presence of fibers within the airspace opposite the low emittance surface does not compromise the effectiveness of the radiant barrier provided by the present invention.

Figure 2A:
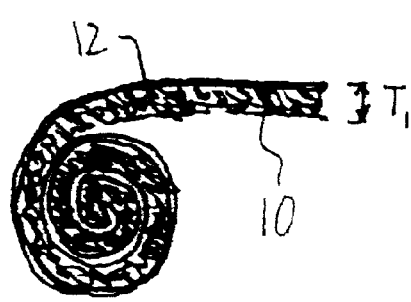
FIGS. 2A and 2B are schematic cross-sectional views showing the flexible reflective insulating structure of FIG. 1 in a compressed storage state and an uncompressed state, respectively.
Figure 2B:
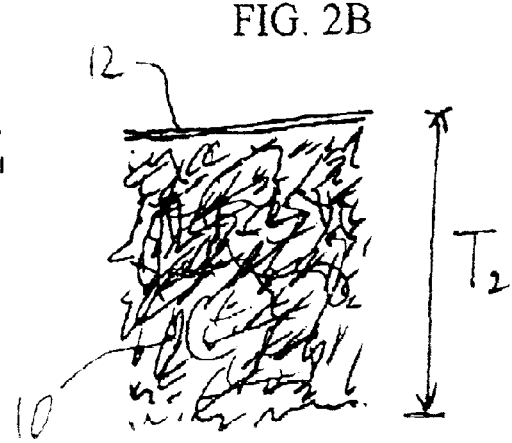

Turning now to FIGS. 1, 2A and 2B, those show a first basic implementation exemplifying the principles of the present invention employing a layer 10 of non-woven fiber-based material.

The use of non-woven material offers a number of particular advantages. Most notably, the non-woven material is preferably configured to be compressible to a compressed state as shown in FIG. 2A, typically for rolling into a rolled storage configuration, and to recover when unrolled to an uncompressed state as shown in FIG. 2B. The maximum extent of volume recovery may take as much as a week to occur. The recovered uncompressed thickness $T_2$ is preferably greater than the compressed thickness $T_1$ by at least a factor of 2, and in preferred cases, by a factor of at least about 5 up to as much as 8 times or more. Thus, a typical layer having a compressed rolled thickness of 2–4 mm may, after volume recovery, provide a fiber-based layer of thickness 10–30 mm. This provides profound cost savings during both storage and transportation.

As mentioned earlier, it is a particular advantage of the use of fiber-based materials that significant resistance is provided to convective air currents. This effect is enhanced by the use of relatively small diameter fibers which offer larger flow damping. Small diameter fibers, on the other hand, have a reduced resiliency which could impede effective volume recovery. To address this problem, the fiber-based material preferably components of fibers with different diameters. Typically, a proportion of roughly 20% by weight of relatively large diameter fibers mixed with about 80% smaller diameter fibers has been found highly effective. The ratio of the diameters of the large diameter to small diameter fibers is at least 2:1 and usually considerably larger, depending upon the properties of the materials used.

To avoid deposition of dust on surface 14, it is a particularly preferred feature of the present invention that the fibers of layer 10 are substantially non-dust-generating under normal conditions of use. To this end, the fibers used are preferably flexible fibers such that the material can be bent, folded, trampled over and otherwise maltreated without breaking sufficient numbers of fibers to produce significant dust. For this reason, flexible fibers more commonly used in the textile industry are generally preferred over the more brittle fibers often used in the field of conventional insulation. Preferred examples include, but are not limited to, polyester fibers, textural polyamide fibers (nylon), and crimped acrylic fibers. In most preferred implementations, layer 10 is formed primarily from polyester fibers, and most preferably, hollow polyester fibers.

In order to provide low contact surface area and an effective airspace for the reflective insulation, for most applications of the present invention, the fiber layer is preferable an "airy" structure of density not exceeding about 4 kg/m$^2$ per 10 cm thickness (uncompressed state). In preferred cases, low density non-woven materials of density no more than about 0.9–2 kg/m$^2$ for 10 cm thickness are used.

Optionally, layer 10 may be processed so that a layer (preferably 2–4 mm thick) adjacent to metallic layer 12 exhibits a reduced density of fibers relative to the bulk of the fiber material. The properties of this surface layer are preferably equivalent to a density of 0.6–1.3 kg/m$^2$ for 10 cm thickness. This may be achieved by known processes such as by surface combing or by removal of a layer of the material from an initially over-thick block. It should be noted, however, that these additional surface-thinning techniques are often unnecessary due to the inherently very low surface contact area of an air fiber-based material against an adjacent surface, as mentioned above.

In order to ensure the required bulk and structural integrity at such low densities, various precautions are preferably taken with respect to the fiber formations within layer 10. Firstly, layer 10 preferably includes crimped fibers, most preferably double crimped, such that the fibers are bent to exhibit non-coplanar portions. In this context, the term "crimped" is used generically to refer to fibers processed by any process which results in frizzy fibers. This provides better mechanical support at relatively low fiber densities. Additionally, the production processes are preferably configured to produce fibers with their primary extensional directions varied sufficiently to produce well-interconnected layers.

An exception to the general preference for low density is in the case of thin fiber-based layers for use in tents and the like where relatively high densities are preferred to provide sufficient structural integrity. Specifically, such structures typically use high density layers of 2–5 mm non-woven or woven material with relatively low compressibility.

Turning now to metallic layer 12, this may most simply be implemented as a sheet of metal foil. Alternatively, in implementations in which a substrate is provided adjacent to the metallic layer (see FIGS. 4 and 5 below), layer 12 may be formed by vapor deposition on a surface of the substrate. Most commonly, aluminum is used, although other low-emittance metals not very rapidly corroded could be substituted therefor. Examples include, but are not limited to, brass, copper, gold, silver, platinum. The low-emittance surface is preferably polished, and most preferably highly polished. Optionally, the metal foil sheet may be treated to also provide low emittance characteristics on its outward-facing surface. However, it should be noted that the primary operative reflective (low emittance) surface according to the present invention remains the inward-facing surface 14 which is protected from the problems of deterioration described below.

Attachment of metallic layer 12 to fiber-based layer 10 is preferably achieved by use of adhesive by one of a number of techniques. According to a first preferred technique, the adhesive is applied to the fiber-based material by a zero-loaded roller in spaced relation to layer 10 so as to come in contact exclusively with fibers projecting outwards from the layer sufficiently to contact metallic layer 12. The metallic layer is then brought into contact with the adhesive-coated fibers. The adhesive used is preferably low-viscosity so as to avoid forming large droplets which could spread on contact with the metallic layer.

Alternative attachment techniques employ forming a pattern of adhesive across a small surface area of either the fiber layer or the metallic layer before bringing the two layers together. A suitable pattern is typically a rectangular, hexagonal or other grid of small dots corresponding to a total area of less than 15%, and preferably less than 5%, or even 3%, of the total surface area.

Suitable adhesives include, but are not limited to, various hot glues, air-drying glues and heat-activated adhesives.

A further alternative attachment technique is the use of minimal-pressure localized welding of fibers of said fiber-based material such that they contact less than about 15%, and preferably less than 5%, or even 3%, of first surface 14.

Turning now to various additional implementations of the present invention, it is a preferred feature of most preferred implementations that layer 10 is enclosed on two opposite faces. This serves to enhance the convective insulating properties of the structure as well as forming a substantially closed unit to prevent penetration of dirt and dust through to the low emittance surfaces. For further enhanced sealing, the structure may optionally be enclosed along its side edges, either during production or during installation, by a thin layer of plastic or the like.

Figure 3:
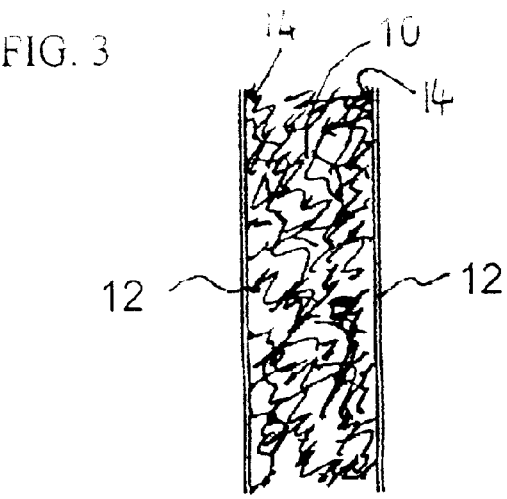
FIG. 3 is a schematic cross-sectional view through a double-sided variant of the embodiment of FIG. 1.

In addition to blocking dust and air flow, where the seal is provided by an additional metallic layer, the structure provides a double radiant barrier function, greatly enhancing the insulating properties. An example of such a structure is shown in FIG. 3, each interface being fully equivalent to that described with reference to FIG. 1.

Figure 4:
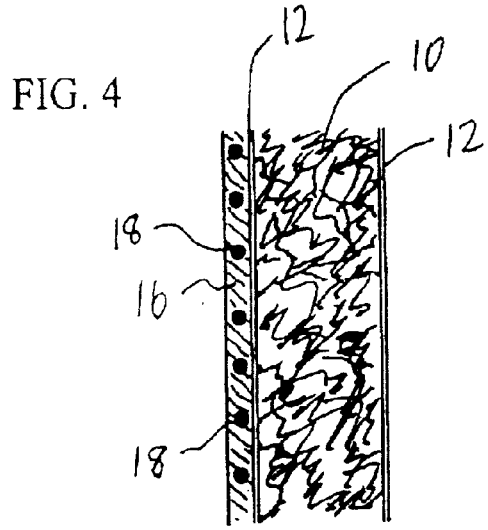
FIG. 4 is a schematic cross-sectional view through a further double-sided variant of the embodiment of FIG. 1 employing a polymer reinforcement layer.

FIG. 4 illustrates a further variation in which the insulating structure further includes a substrate layer 16 attached to the outer surface of metallic layer 12. In this case, as mentioned earlier, metallic layer may be either a foil layer bonded to the substrate layer or a coating deposited thereon. Depending upon the intended application, substrate layer 16 may be chosen to provide the desired degree of mechanical strength, wear resistance, weatherproofing or other physical and mechanical properties. Examples of suitable substrate layers include, but are not limited to, textiles, paper and various polymers including polyethylene, PVC, nylon and polyesters. For certain applications, the use of textile substrates and other non-tearing polymer substrates offer particular advantages since they make it possible to sew the structure. In such cases, sewing may become the primary mode of interconnection of the various layers of the structure. To ensure that the locations of the threads do not compromise the insulative properties, a sealant is preferably applied to the regions sewed. Additionally, or alternatively, thread may be used which swells on exposure to moisture so as to seal the apertures formed by sewing. For all-weather applications such as for all-purpose tents, a most preferred option is plasticized PVC with additives for UV and weathering resistance.

Figure 9:
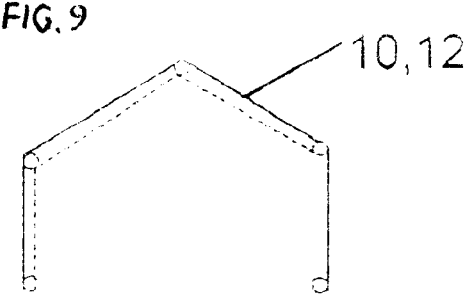
FIG. 9 is a schematic cross-sectional view of an application of the present invention to a tent.

By way of example, with brief reference to FIG. 9, there is shown a tent formed with at least one wall implemented as an insulating structure according to the present invention. In this context, the word "tent" is used to refer generically to any structure formed primarily by a flexible material which is supported by a support structure or which is air-supported. The polymer material for such applications preferably has a thickness of at least about 50 $\mu$m, and preferably at least about 500 $\mu$m, and contains at least one additive chosen to enhance weatherproof properties of the material.

For increased structural strength, polymer implementations of substrate layer 16 may include a plurality of reinforcing elements 18. The reinforcing elements are chosen to provide improved tensile strength. Examples of suitable reinforcing elements include, but are not limited to, elongated fibrous material, woven and non-woven cloths.

Figure 5:
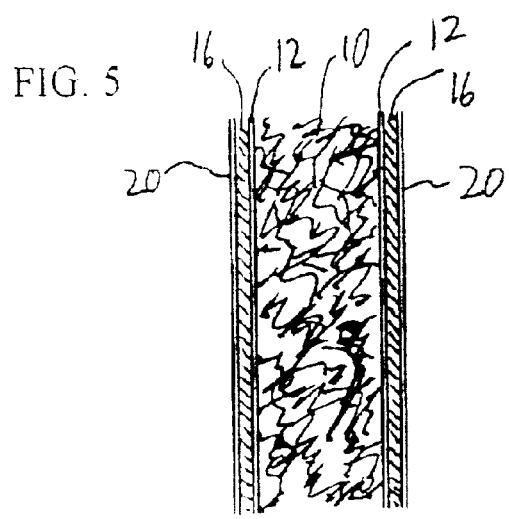
FIG. 5 is a schematic cross-sectional view through another double-sided variant of the embodiment of FIG. 1 employing polymer reinforced reflective layers.

Turning now to FIG. 5, this shows a further variant in which a second metallic layer 20 is either attached to, or vapor deposited onto, a rear surface of substrate layer 16. This forms a reinforced sandwich structure with emittance properties equivalent to a sheet of foil with two low-emittance surfaces. Although, as mentioned earlier, the principal reflective barriers of the present invention are provided by surfaces facing towards fiber-based layer 10, the outward facing surfaces of layers 20 may in many cases be deployed to provide a further enhancement to the reflective insulation properties.

Figure 6:
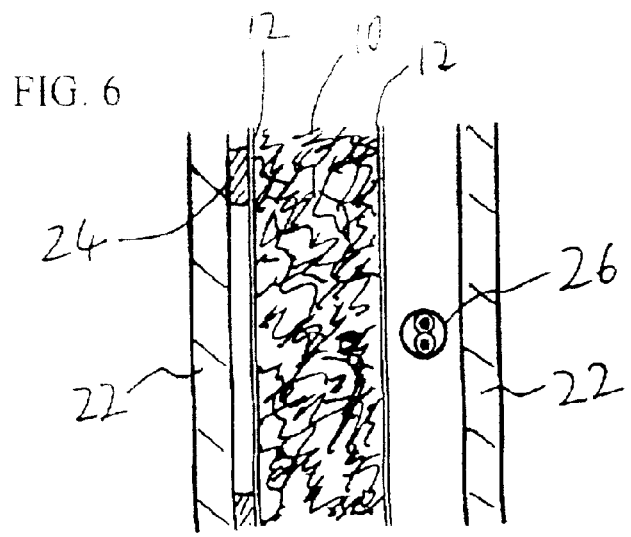
FIG. 6 is a schematic cross-sectional view showing an implementation of cavity wall insulation using a flexible reflective insulating structure according to the present invention.
Figure 7:
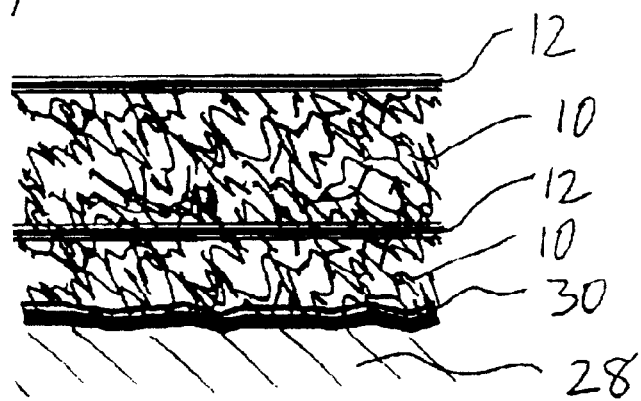
FIG. 7 is a schematic cross-sectional view showing an implementation of loft insulation using a flexible reflective insulating structure according to the present invention.

FIGS. 6 and 7 illustrate certain applications of the present invention. FIG. 6 illustrates a cavity wall 22 within which the insulating structure of FIG. 3 or 5 has been fitted. Preferably, the structure is mounted via a number of spacer elements 24 with a small gap from the internal wall surface. The resulting airspace provides an additional barrier to conductive heat flow and, in the case of the structure of FIG. 5, provides an additional radiant barrier. On the other side, a larger gap may be required, such as to accommodate electric cables 26 or the like. However, it should be appreciated that the present invention may readily be configured to fill virtually any thickness of cavity to whatever degree desired, either by use of a single thick fiber-based layer 10, or by repeating part or all of the layer structure.

FIG. 7 shows an application of the present invention to loft insulation applied over a concrete or plaster ceiling 28. Here, the reflective insulation structure is shown implemented as a multi-layer structure with two layers 10 of fiber-based material each topped by a metallic layer 12. At least the intermediate metallic layer 12 is preferably implemented as the sandwich structure described with reference to FIG. 5 above, thereby providing an additional upward-facing radiant barrier. Optionally, an additional polymer layer 30 may be deployed below the lower fiber-based layer 10 to seal the bottom of the insulating structure.

It should be noted in the context of this and other implementations of the invention that there is considerable flexibility as to the form in which the structures are supplied and transported prior to development. Thus, in the case of FIG. 7, the structure may be supplied as a reflective sheet (or "sandwich") with a fiber-based layer attached to opposite surfaces. The uppermost metallic layer may then be attached during installation. Alternatively, the upper layers may be supplied as a unit similar to that described with reference to FIG. 5 which is either attached to, or simply positioned overlying, a separately deployed fiber-based layer 10. In a further alternative, the structure could be formed by combining the structures described with reference to FIGS. 1 (the lower portion of FIG. 7) and 3 (the upper portion).

Figure 8:
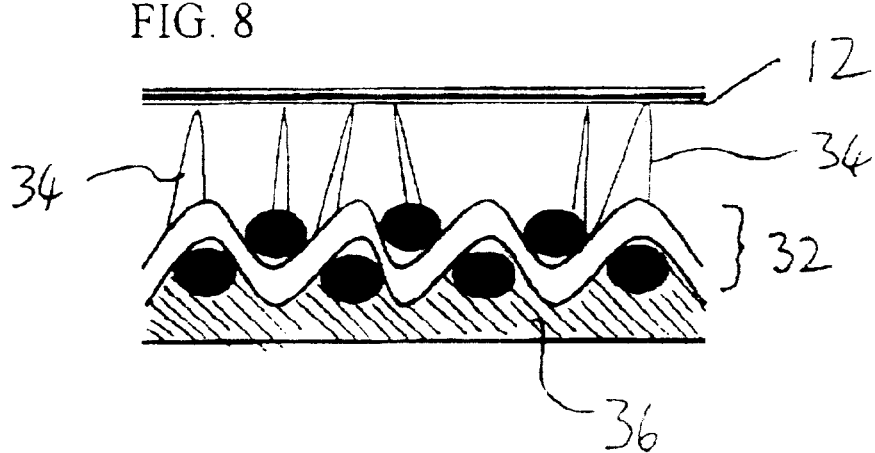
FIG. 8 is a schematic cross-sectional view through a polymer-reinforced embodiment of a flexible reflective insulating structure, constructed and operative according to the teachings of the present invention, including a woven fiber layer.

Turning finally to FIG. 8, it should be noted that the present invention may also be implemented using a layer of woven fiber-based material 32. Typically, woven materials of thickness up to about 2.5 mm are believed to be economically viable for such applications. The material may optionally be reinforced by use of a polymer backing 36 or the like.

In many cases, a sufficient proportion of fibers project irregularly from the main body of the woven material to allow low-contact-area attachment of the metallic layer without further preparation. In other cases, however, it is preferable to process the material, typically by the process known a "raising", to provide a plurality of raised fibers 34 projecting outwards from the woven material for supporting metallic layer 12.

Although typically less compressible than the non-woven implementations of the present invention, raised fibers 34 generally provide a significant degree of resilient compressibility such that thickness reductions of about a factor of 2 may be achieved.

It will be appreciated that the above descriptions are intended only to serve as examples, and that many other embodiments are possible within the spirit and the scope of the present invention.

What is claimed is:

1. A flexible reflective insulating structure comprising:
   (a) a layer of substantially non-dust-generating, flexible fiber-based material; and
   (b) a flexible metallic layer having a first surface of emissivity less than 0.1, said metallic layer being attached by adhesive to said layer of fiber-based material with said first surface facing towards said layer of fiber-based material, said adhesive being present on less than about 15% of said first surface such that said emissivity of at least about 85% of said first surface is substantially unaffected, wherein said layer of fiber-based material exhibits a reduced density of fibers in a region adjacent to said metallic layer relative to an average density of fibers in said fiber-based material.

2. The insulating structure of claim 1, wherein said first surface has an emissivity of no more than 0.05.

3. The insulating structure of claim 1, wherein said metallic layer is attached to said layer of fiber-based material in a manner such that said emissivity of at least about 95% of said first surface is substantially unaffected.

4. The insulating structure of claim 1, wherein said metallic layer is attached to said layer of fiber-based material in a manner such that said emissivity of at least about 97% of said first surface is substantially unaffected.

5. The insulating structure of claim 1, wherein said layer of fiber-based material is a non-woven material.

6. The insulating structure of claim 5, wherein said non-woven material is configured to be compressible to a compressed state for rolling to a rolled storage configuration and to recover when unrolled to an uncompressed state, said non-woven material occupying a volume when in said uncompressed state which is at least about two times a volume occupied by said non-woven material when in said compressed state.

7. The insulating structure of claim 6, wherein said non-woven material has a bulk density of no more than about 4 kg/m$^2$ per 10 cm thickness when in said uncompressed state.

8. The insulating structure of claim 6, wherein said non-woven material has a bulk density within the range from about 0.9 to about 2 kg/m$^2$ per 10 cm thickness when in said uncompressed state.

9. The insulating structure of claim 1, wherein said layer of fiber-based material is formed primarily from polyester fibers.

10. The insulating structure of claim 1, wherein said layer of fiber-based material includes crimped fibers.

11. The insulating structure of claim 1, wherein said layer of fiber-based material includes a first component of fibers having a first diameter and a second component of fibers having a second diameter, said second diameter being at least twice said first diameter.

12. The insulating structure of claim 1, wherein said layer of fiber-based material is a woven material, said woven material being processed to provide a plurality of raised fibers projecting outwards from said woven material for supporting said metallic layer.

13. The insulating structure of claim 1, wherein said metallic layer is a sheet of metal foil.

14. The insulating structure of claim 13, wherein said sheet of metal foil has a second surface opposite to said first surface, the insulating structure further comprising a substrate layer attached to said second surface.

15. The insulating structure of claim 14, wherein said substrate layer is formed primarily from polymer material.

16. The insulating structure of claim 15, wherein said polymer material has a thickness of at least about 50 $\mu$m and contains at least one additive chosen to enhance weatherproof properties of said polymer material.

17. The insulating structure of claim 15, wherein said polymer material is selected to be a non-tearing material, said polymer material, said metallic layer and said fiber-based material being sewed together.

18. The insulating structure of claim 17, further comprising a sealant applied to said structure so as to seal regions which are sewed together.

19. The insulating structure of claim 15, wherein said layer of polymer material includes a plurality of reinforcing elements.

20. The insulating structure of claim 14, further comprising a second metallic layer associated with a rear surface of said substrate layer.

21. The insulating structure of claim 1, wherein said metallic layer is implemented as a layer of metal deposited onto a surface of a flexible substrate layer.

22. The insulating structure of claim 21, wherein said substrate layer is formed primarily from polymer material.

23. The insulating structure of claim 22, further comprising a second metallic layer associated with a rear surface of said layer of polymer material.

24. A tent comprising at least one wall formed from the insulating structure of claim 1.

* * * * *